US010046655B2

(12) United States Patent
Lasagni

(10) Patent No.: US 10,046,655 B2
(45) Date of Patent: Aug. 14, 2018

(54) ELECTRIC VEHICLE BATTERY CHARGER COMPRISING A PFC CIRCUIT

(71) Applicant: Meta System S.p.A., Reggio Emilia (IT)

(72) Inventor: Cesare Lasagni, Reggio Emilia (IT)

(73) Assignee: Meta System S.p.A., Reggio Emilia (IT)

( * ) Notice: Subject to any disclaimer, the term of this patent is extended or adjusted under 35 U.S.C. 154(b) by 113 days.

(21) Appl. No.: 15/024,490

(22) PCT Filed: Sep. 22, 2014

(86) PCT No.: PCT/IB2014/064740
§ 371 (c)(1),
(2) Date: Mar. 24, 2016

(87) PCT Pub. No.: WO2015/044856
PCT Pub. Date: Apr. 2, 2015

(65) Prior Publication Data
US 2016/0243952 A1    Aug. 25, 2016

(30) Foreign Application Priority Data
Sep. 26, 2013    (IT) .............................. MO2013A0267

(51) Int. Cl.
*B60L 11/18*    (2006.01)
*H02J 5/00*    (2016.01)
(Continued)

(52) U.S. Cl.
CPC ....... *B60L 11/1811* (2013.01); *B60L 11/1838* (2013.01); *H02J 5/00* (2013.01);
(Continued)

(58) Field of Classification Search
CPC ............ B60L 11/1811; B60L 11/1838; H02M 1/4208; H02M 2001/007;
(Continued)

(56) References Cited

U.S. PATENT DOCUMENTS 7,446,503 B2 * 11/2008 Stanzel .................. H02J 7/022
320/128
7,456,518 B2 * 11/2008 Hjort ...................... H02J 9/062
307/64
(Continued)

FOREIGN PATENT DOCUMENTS

FR    2947114    12/2010
JP    2006-304430    11/2006
(Continued)

OTHER PUBLICATIONS

International Search Report and the Written Opinion dated Nov. 21, 2014 From the International Searching Authority Re. Application No. PCT/IB2014/064740 and Its Translation Into English.

*Primary Examiner* — Naum B Levin

(57) ABSTRACT

The battery charger (C) for electric vehicles comprises a voltage converter (DC/DC CONV), a power factor correction circuit (PFC) connected upstream of the voltage converter (DC/DC CONV), a controller circuit (PFC CNTR) operatively connected to the correction circuit (PFC) and suitable for piloting the correction circuit (PFC) for the correction of the power factor in the battery charger (C), a retroaction line (L) connected to the output of the voltage converter (DC/DC CONV) and to an input of the controller circuit (PFC CNTR), wherein the controller circuit (PFC CNTR) is suitable for varying the output voltage ($V_{PFC}$) of the correction circuit (PFC) within a predefined voltage interval and according to the output voltage ($V_{DCOUT}$) of the voltage converter (DC/DC CONV), in order to let the
(Continued)

voltage converter (DC/DC CONV) operate as much as possible around the point of maximum efficiency.

4 Claims, 1 Drawing Sheet

(51) Int. Cl.
  *H02M 1/42* (2007.01)
  *H02J 7/02* (2016.01)
  *H02M 1/00* (2006.01)

(52) U.S. Cl.
  CPC .............. *H02J 7/02* (2013.01); *H02M 1/4208* (2013.01); *H02M 2001/007* (2013.01); *H02M 2001/0048* (2013.01); *Y02B 70/126* (2013.01); *Y02B 70/1491* (2013.01); *Y02T 90/127* (2013.01)

(58) Field of Classification Search
  CPC .............. H02M 2001/0048; H02J 7/02; Y02B 70/1491; Y02B 70/126; Y02T 90/127
  See application file for complete search history.

(56) References Cited

U.S. PATENT DOCUMENTS

| | | | | |
|---|---|---|---|---|
| 8,587,252 B2* | 11/2013 | Reggio | ............ | H02M 3/33515 320/104 |
| 8,723,487 B2* | 5/2014 | Pahlevaninezhad | .... | H02M 1/42 323/207 |
| 9,257,864 B2* | 2/2016 | Pahlevaninezhad | .... | H02J 7/022 |
| 9,391,524 B2* | 7/2016 | Oh | .................... | H02M 3/33507 |
| 9,450,436 B2* | 9/2016 | Carletti | ............... | H02M 1/4225 |
| 9,637,011 B2* | 5/2017 | Biagini | .................... | B60L 1/14 |
| 9,667,153 B2* | 5/2017 | Hara | .................. | H02M 3/33507 |
| 2003/0095421 A1* | 5/2003 | Kadatskyy | ............... | H02M 1/34 363/65 |
| 2007/0086222 A1 | 4/2007 | Iida | | |
| 2011/0156643 A1* | 6/2011 | Chen | ................... | B60L 11/1811 320/109 |
| 2011/0292703 A1* | 12/2011 | Cuk | ................... | H02M 1/4258 363/126 |
| 2012/0126742 A1* | 5/2012 | Reggio | ............. | H02M 3/33515 320/104 |
| 2013/0088196 A1* | 4/2013 | Chen | ................... | B60L 11/1811 320/109 |
| 2013/0285621 A1* | 10/2013 | Cho | ........................ | H02M 7/04 320/162 |
| 2014/0015496 A1* | 1/2014 | Nishiguchi | ............. | H02J 7/007 320/162 |
| 2014/0077770 A1* | 3/2014 | Omoto | ................ | H02M 1/4225 320/140 |
| 2014/0176049 A1* | 6/2014 | Yamada | ................. | H02J 7/025 320/107 |
| 2016/0105056 A1* | 4/2016 | Namurdri | ................ | H02J 7/02 320/108 |

FOREIGN PATENT DOCUMENTS

| | | |
|---|---|---|
| WO | WO 2013/132020 | 9/2013 |
| WO | WO 2015/044856 | 4/2015 |

* cited by examiner

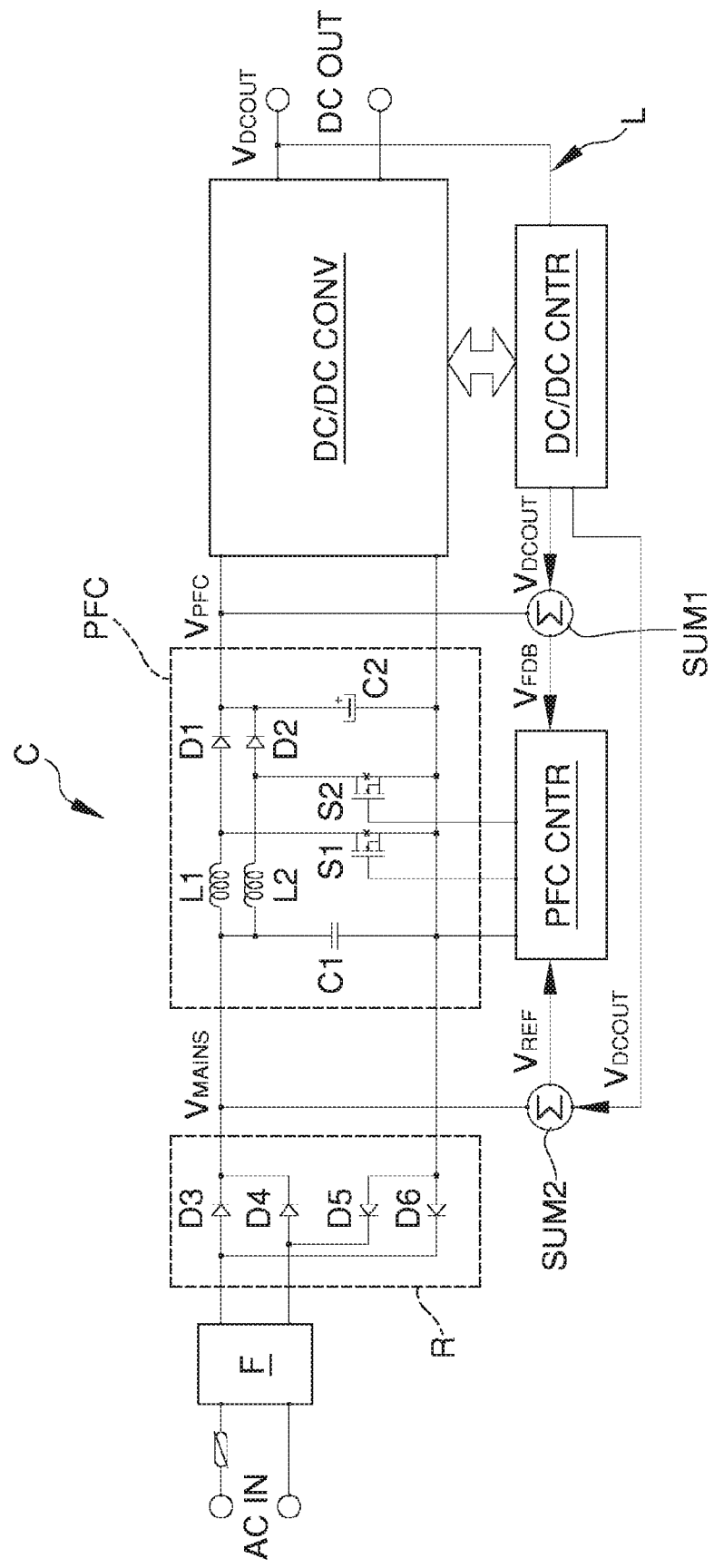

10,046,655 B2

ELECTRIC VEHICLE BATTERY CHARGER COMPRISING A PFC CIRCUIT

RELATED APPLICATIONS

This application is a National Phase of PCT Patent Application No. PCT/IB2014/064740 having International filing date of Sep. 22, 2014, which claims the benefit of priority of Italian Patent Application No. MO2013A000267 filed on Sep. 26, 2013. The contents of the above applications are all incorporated by reference as if fully set forth herein in their entirety.

FIELD AND BACKGROUND OF THE INVENTION

The use is known, in common AC/DC conversion circuits of a certain power, of two stages connected together.

The first stage is the PFC (Power Factor Correction) at input, designed to take a current from the mains which is as sinusoidal as possible and in phase with the input voltage, so as to absorb the maximum active power without however requiring from the mains absorption peaks tied to electrolytic capacities.

The PFC generally supplies a constant direct voltage stabilized with the next stage.

The second stage consists of a DC/DC converter which, taking the voltage supplied by the PFC, supplies at output a direct voltage, variable or fixed according to the user's requests, at the same time achieving the necessary galvanic insulation between mains voltage and output.

The typical intrinsic structure of the PFC does not envisage galvanic insulation and, because of the very type adopted, cannot supply at output a voltage below the peak value of the rectified input voltage. Considering the rated European voltage of 230 Volt with relative tolerances generally equal to +15/−20%, it can be presumed that, with an input voltage of 230V+15%≈265V to which corresponds a peak value of 265×1.41≈374 Volt, the stabilized voltage which the PFC can supply cannot be below around 275 Volt ignoring the various losses in the circuit.

This is the reason why, in the aforementioned conversion circuits, the output voltage of the PFC is generally set between 275 and 280 Volts or close-enough values.

This way, the certainty exists of the correct operation of this stage in the entire range of input voltages, without, correspondingly, there being any appreciable changes in output voltage.

The DC/DC stage which is downstream of the PFC is therefore generally supplied with this fixed and stabilized voltage.

In modern circuits of the resonant type, maximum efficiency is achieved by making the stage work in a highly precise point called "point of resonance" which is closely tied by the input/output voltage ratio according to the sizing of the circuit itself.

In practice, it is certainly possible to also optimize efficiency at very high values if both input voltage and output voltage are fixed. Now, the input voltage is fixed and ensured by the PFC but, in the event of the output voltage having to vary, there is a drop in efficiency of the stage forced to operate out of resonance.

Considering in particular the battery chargers used for electric vehicles, the output voltage of these devices must provide a large variation interval according to whether the battery is down or fully charged.

It is therefore obvious that, without particular solutions, the performance of these devices will only be maximized around the point of resonance and penalized in all the other points relating to the various values of the output voltage.

A possible solution is therefore to vary the input voltage of the DC/DC converter so as to follow the variations required by the output as much as possible, thereby making the system always work around the point of resonance.

SUMMARY OF THE INVENTION

The main aim of the present invention is to provide a battery charger for electric vehicles which allows the adjustment of the output voltage within a predefined operating interval, without negatively affecting the overall efficiency of the battery charger itself.

Another object of the present invention is to provide a battery charger for electric vehicles which can overcome the above mentioned drawbacks of the prior art in the ambit of a simple, rational, easy and effective to use as well as low cost solution.

The above mentioned objects are achieved by the present battery charger for electric vehicles according to claim 1.

BRIEF DESCRIPTION OF THE SEVERAL VIEWS OF THE DRAWINGS

Other characteristics and advantages of the present invention will become better evident from the description of a preferred, but not exclusive, embodiment of a battery charger for electric vehicles, illustrated by way of an indicative, but not limitative, example in the enclosed table of drawing, in which:

FIG. 1 is a general diagram of the battery charger according to the invention.

DESCRIPTION OF SPECIFIC EMBODIMENTS OF THE INVENTION

With particular reference to these figures, globally indicated by C is a battery charger which can be used for charging batteries of electric vehicles.

In particular, the battery charger C comprises:
a resonant DC/DC CONV voltage converter;
a PFC power factor correction circuit connected upstream of the DC/DC CONV voltage converter;
a PFC CNTR controller circuit connected to the PFC correction circuit and suitable for piloting the correction circuit itself for the correction of the power factor and for the supply of a VPFC direct and stabilized voltage at output.

In particular, the DC/DC CONV voltage converter consists of a DC/DC converter with resonant LLC technology.

Advantageously, the battery charger C also comprises a retroaction line L connected to the output of the DC/DC CONV voltage converter and to an input of the PFC CNTR controller circuit.

In particular, the PFC CNTR controller circuit is suitable for piloting the PFC correction circuit, so as to be able to vary the VPFC output voltage at input of the DC/DC CONV voltage converter within a predefined voltage interval, according to the VDCOUT voltage at output of the converter itself and compatibly with the VMAINS mains input voltage.

According to the present invention, and unlike normal conversion circuits, such voltage can therefore be varied according to the needs of the DC/DC converter and compatibly with the input voltage value.

In the circuit taken into examination for demo purpose only, the battery charger is connected to a high-voltage battery for electric cars which is fully charged at around 400 Volts and completely down at around 280 Volts.

The transformation ratio adopted in the DC/DC converter is 1:1 and therefore, to always be able to work at the point of maximum efficiency, the input voltage and output voltage of the DC/DC stage should be as similar as possible.

Usefully, the PFC correction circuit, compatibly with the VMAINS input voltage, is piloted so as to vary the VPFC output voltage at input of the DC/DC CONV voltage converter between 280V and 400V, so as to ensure a greater efficiency of the battery charger C according to the amount of voltage to be supplied to the battery connected to its output.

With reference to the particular embodiment shown in FIG. 1, the PFC CNTR controller circuit comprises a first input connected to the output of the DC/DC CONV voltage converter through the retroaction line L.

Usefully, the retroaction line L comprises a first adder SUM1, of the type for example of a suitably configured analogue adder, having a first input connected to the output of the PFC correction circuit, a second input connected to the output of the DC/DC CONV voltage converter and an output connected to the first input of the PFC CNTR controller circuit.

The first adder SUM1 receives at input the VDCOUT voltage at output of the DC/DC CONV voltage converter and the VPFC voltage at output of the PFC correction circuit and gives back a VFDB retroaction voltage at output, determined according to the VDCOUT and VPFC voltages.

Furthermore, the PFC CNTR correction circuit comprises a second input connected to the input of said PFC correction circuit.

Usefully, the retroaction line L comprises a second adder SUM2 having a first input connected to the input of the PFC correction circuit, a second input connected to the output of the DC/DC CONV voltage converter and an output connected to the second input of the PFC CNTR controller circuit.

The second adder SUM2 receives at input the VDCOUT voltage at output of the DC/DC CONV voltage converter and the VMAINS voltage at output of the rectifier circuit R and gives back a VREF reference voltage at output, determined according to the VDCOUT and VMAINS voltages.

In practice, the PFC CNTR controller circuit controls the VPFC output voltage of the PFC correction circuit, also knowing by means of the retroaction the VDCOUT output voltage of the battery charger C, and adjusts it so as to make it as similar as possible thereby always making the convertor operate around the resonance.

The purpose of the second adder SUM2 is to restrict this adjustment according to the input voltage.

Consequently, if the VDCOUT output voltage drops, the PFC CNTR controller circuit adjusts the VPFC and reduces it. Vice versa, if the VDCOUT output voltage increases, the PFC CNTR controller circuit adjusts the VPFC, increasing it.

With reference to the particular embodiment shown in the illustrations, the battery charger C comprises at least a second DC/DC CONTR control circuit operatively connected to the DC/DC CONV voltage converter.

In particular, the second DC/DC CONTR control circuit comprises a first input connected to the DC/DC CONV voltage converter, a first output connected to the first adder SUM1 and a second output connected to the second adder SUM2.

The battery charger C also comprises the rectifier circuit R connected upstream of the PFC correction circuit.

Finally, the battery charger C comprises a filter F connected upstream of said rectifier circuit R.

It has in fact been ascertained how the described invention achieves the proposed objects.

In particular, the fact is underlined that the adjustment of the output voltage of the PFC within a predefined operating interval, preferably between 280V and 400V permits, compatibly with the VMAINS input voltage, obtaining a battery charger with greater efficiency. In fact, with mains values around or less than the rated one, the DC/AC converter can be made to work around the resonance, the point of maximum efficiency.

What is claimed is:

1. A battery charger (C) for electric vehicles, comprising:
   at least a voltage converter, DC/DC CONV;
   at least a power factor correction circuit, PFC, connected upstream of said, DC/DC CONV;
   at least a controller circuit, PFC CNTR, operatively connected to said PFC and suitable for piloting said PFC for the correction of the power factor in said battery charger (C); and
   at least a retroaction line (L) connected to the output of said DC/DC CONV and to at least an input of said PFC CNTR;
   wherein said PFC CNTR comprises at least a first input connected to the output of said DC/DC CONV through said retroaction line (L) and at least a second input connected to the input of said PFC;
   wherein said PFC CNTR is configured to vary an output voltage (VPFC) of said PFC within a predefined voltage interval and according to an output voltage, VDCOUT, of said DC/DC CONV and compatibly with a main input voltage in order to let said DC/DC CONV operate as much as possible around the point of maximum efficiency;
   wherein said retroaction line (L) comprises at least a first adder (SUM1) having a first input connected to the output of said PFC, a second input connected to the output of said DC/DC CONV and an output connected to said first input of the controller circuit (PFC CNTR).

2. A battery charger (C) for electric vehicles, comprising:
   at least a voltage converter, DC/DC CONV;
   at least a power factor correction circuit, PFC, connected upstream of said, DC/DC CONV;
   at least a controller circuit, PFC CNTR, operatively connected to said PFC and suitable for piloting said PFC for the correction of the power factor in said battery charger (C); and
   at least a retroaction line (L) connected to the output of said DC/DC CONV and to at least an input of said PFC CNTR;
   wherein said PFC CNTR comprises at least a first input connected to the output of said DC/DC CONV through said retroaction line (L) and at least a second input connected to the input of said PFC;
   wherein said PFC CNTR is configured to vary an output voltage (VPFC) of said PFC within a predefined voltage interval and according to an output voltage, VDCOUT, of said DC/DC CONV and compatibly with a main input voltage in order to let said DC/DC CONV operate as much as possible around the point of maximum efficiency;

wherein said retroaction line (L) comprises at least a second adder (SUM2) having a first input connected to the input of said PFC, a second input connected to the output of said DC/DC CONV and an output connected to said second input of the controller circuit (PFC CNTR).

3. The battery charger according to claim 1, wherein said voltage converter (DC/DC CONV) comprises at least a DC-DC converter.

4. A battery charger (C) for electric vehicles, comprising:
at least a voltage converter, DC/DC CONV;
at least a power factor correction circuit, PFC, connected upstream of said, DC/DC CONV;
at least a controller circuit, PFC CNTR, operatively connected to said PFC and suitable for piloting said PFC for the correction of the power factor in said battery charger (C);
at least a retroaction line (L) connected to the output of said DC/DC CONV and to at least an input of said PFC CNTR; and
at least a second DC/DC CONTR operatively connected to said DC/DC CONV;
wherein said PFC CNTR comprises at least a first input connected to the output of said DC/DC CONV through said retroaction line (L) and at least a second input connected to the input of said PFC;
wherein said PFC CNTR is configured to vary an output voltage (VPFC) of said PFC within a predefined voltage interval and according to an output voltage, VDCOUT, of said DC/DC CONV and compatibly with a main input voltage in order to let said DC/DC CONV operate as much as possible around the point of maximum efficiency;
wherein said second DC/DC CONTR comprises a first input connected to said DC/DC CONV, a first output connected to a first adder (SUM1) having a first input connected to the output of said PFC and a second output connected to a second adder (SUM2) having a first input connected to the input of said PFC.

* * * * *